United States Patent [19]
Chao

[11] Patent Number: 5,882,101
[45] Date of Patent: Mar. 16, 1999

[54] AUXILIARY FRAMES WITH EARS AND LATERAL PROJECTIONS

[75] Inventor: David Yinkai Chao, Towson, Md.

[73] Assignee: Contour Optik Inc., Chiayi, Taiwan

[21] Appl. No.: 847,707

[22] Filed: Apr. 28, 1997

[51] Int. Cl.[6] .............................. G07C 9/00; G07C 7/08
[52] U.S. Cl. ............................................. 351/47; 351/57
[58] Field of Search ................................ 351/47, 48, 57, 351/58, 41, 44

[56] References Cited

U.S. PATENT DOCUMENTS

| | | | |
|---|---|---|---|
| 4,070,103 | 1/1978 | Meeker | 351/52 |
| 5,568,207 | 10/1996 | Chao | 351/57 |
| 5,642,177 | 6/1997 | Sunreeve | 351/47 |

FOREIGN PATENT DOCUMENTS

| | | |
|---|---|---|
| 76209045 | 9/1976 | China . |
| 1061253 | 4/1954 | European Pat. Off. . |
| 85 07 761 U | 6/1985 | Germany . |
| 88 06 898 U | 10/1988 | Germany . |
| 2-109325 | 8/1991 | Japan . |
| 7-128620 | 5/1995 | Japan . |
| WO 90/09611 | 8/1990 | WIPO . |

OTHER PUBLICATIONS

Documents describing Twincome in a Patent Opposition Proceeding in Germany initiated by Pentax, on or around Apr. 30, 1997.

*Primary Examiner*—Hung Xuan Dang
*Attorney, Agent, or Firm*—Fliesler Dubb Meyer & Lovejoy, LLP

[57] ABSTRACT

An eyeglass mechanism includes a primary frame having two side studs for pivotally coupling two legs. An auxiliary frame for disposing in front of the primary frame includes two sides each having an extension for engaging over the stud. The extensions each may include a magnet for engaging with another magnet engaged in the leg or with the magnetic leg and for securing the auxiliary frame to the primary frame. The extensions each includes a hook for securing to the legs without the magnets.

1 Claim, 1 Drawing Sheet

AUXILIARY FRAMES WITH EARS AND LATERAL PROJECTIONS

BACKGROUND OF THE INVENTION

1. Field of the Invention

The present invention relates to a pair of eyeglasses, and more particularly to a pair of eyeglasses having an auxiliary frame for supporting auxiliary lenses.

2. Description of the Prior Art

The closest prior art of which applicant is aware is U.S. Pat. No. 5,568,207 to Chao and has been assigned to the present assignee. The auxiliary frame may not be engaged with the legs.

The present invention has arisen to provide a novel configuration for securing the auxiliary frame to the primary frame.

SUMMARY OF THE INVENTION

The primary objective of the present invention is to provide an eyeglass mechanism in which the legs of the primary frame each includes a magnet for engaging with a hook and/or a magnet of the auxiliary frame for solidly and stably securing the auxiliary frame to the primary frame.

The other objective of the present invention is to provide an eyeglass mechanism in which the extensions of the auxiliary frame each includes a hook member for solidly securing the auxiliary frame to the primary without the magnets.

In accordance with one aspect of the invention, there is provided an eyeglass mechanism comprising an eyeglass mechanism comprising a primary frame including two sides each having a stud, two legs pivotally coupled to the studs respectively, an auxiliary frame for disposing in front of the primary frame, the auxiliary frame including two sides each having an extension for extending over the stud and for engaging with the leg, and means for securing the extensions to the legs and for securing the auxiliary frame to the primary frame.

The legs are made of magnetic material, the securing mean includes two magnets engaged in the extensions for engaging with the legs and for securing the auxiliary frame to the primary frame.

The extensions each includes an ear extended downward for supporting the securing means.

The securing means includes two first magnets secured in the legs and includes two second magnets secured in the extension is for engaging with the first magnets and for securing the auxiliary frame to the primary frame.

The securing means includes a pair of hooks provided in the extensions for engaging with the legs and for securing the auxiliary frame to the primary frame.

The hooks each includes an ear extended downward from the extension and each includes a projection laterally extended outward for engaging with the legs.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
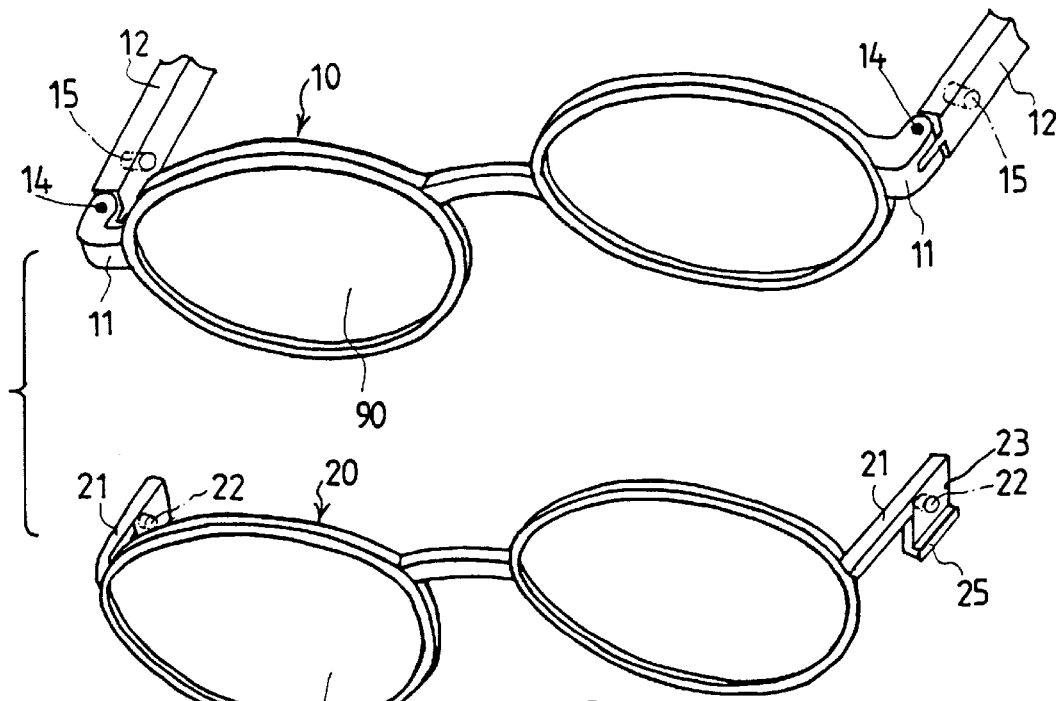
FIG. 1 is an exploded view of an eyeglass mechanism having an auxiliary frame in accordance with the present invention.
Figure 2:
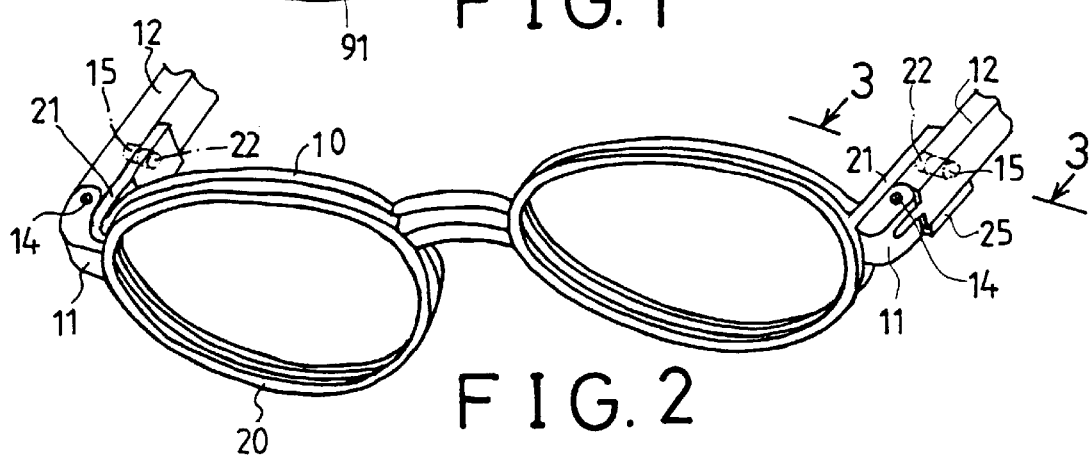
FIG. 2 is a perspective view of the eyeglass mechanism.

Referring to the drawings, and initially to FIGS. 1 and 2, an eyeglass mechanism in accordance with the present invention comprises a primary frame 10 for supporting primary lenses 90 and including two studs 11 formed in the side portions. Two legs 12 each is pivotally coupled to the studs 11 at a pivot shaft 14 and each includes a magnet 15 secured close to the pivot shaft 14. An auxiliary frame 20 for supporting auxiliary lenses 91 and for disposing in front of the primary frame includes two extensions 21 disposed in the side portions and extended rearward for engaging over the studs 11 of the primary frame 10 respectively.

The extensions 21 each includes a magnet 22 for engaging with the magnet 15 of the stud 11 and for securing the auxiliary frame 20 to the primary frame 10.

Figure 3:
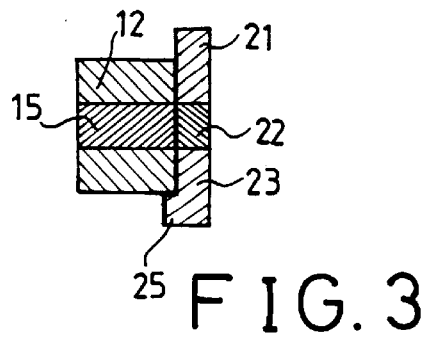
FIG. 3 is a cross sectional view taken along lines 3—3 of FIG. 2.

It is preferable that the extensions 21 each includes an ear 23 extended downward for engaging with the magnets 22 and for allowing the magnets 22 to be aligned with the magnets 15 of the studs 11. It is further preferable that the ears 23 each includes a rib or a projection 25 laterally extended downward (FIGS. 1 and 3) for forming a hooking member and for solidly engaging with the leg 12 and for solidly securing the auxiliary frame 20 to the primary frame 10. The ears 23 and the projections 25 may solidly secure the extensions 21 to the primary frame 10 without the magnets 15, 22.

Alternatively, when the legs 12 are made of magnetic material, such as metal, the magnets 22 may also engage with the legs 12 for securing the auxiliary frame to the primary frame without the magnets 15.

Accordingly, the eyeglass mechanism in accordance with the present intention includes a primary frame having two magnets secured in the legs for engaging with the magnets of the auxiliary frame and for solidly and stably securing the auxiliary frame to the primary frame. The extensions of the auxiliary frame may each include a hook member for solidly securing the auxiliary frame to the primary without the magnets.

Alternatively, the extensions 21 may be engaged with the outer portions of the legs 12, and the projections 25 may be extended laterally inward for engaging with the bottom of the legs 12.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An eyeglass mechanism comprising:

a primary frame including two sides each having a stud, two legs pivotally coupled to said studs respectively, an auxiliary frame for disposing in front of said primary frame, said auxiliary frame including two sides each having an extension for extending over said stud and for engaging with said leg, and a pair of hooks provided in said extensions for securing said auxiliary frame to said primary frame, wherein said hooks each includes an ear extended downward from said extension and each includes a projection laterally extended outward for engaging with said legs.

* * * * *